United States Patent [19]

Hepburn et al.

[11] Patent Number: 5,758,489

[45] Date of Patent: Jun. 2, 1998

[54] SULFUR TOLERANT PT/LITHIUM NOX TRAPS

[75] Inventors: Jeffrey S. Hepburn, Dearborn, Mich.; William L. H. Watkins, Toledo, Ohio

[73] Assignee: Ford Global Technologies, Inc., Dearborn, Mich.

[21] Appl. No.: 663,445

[22] Filed: Jun. 13, 1996

[51] Int. Cl.$^6$ .................. B01J 8/02; F01N 3/28
[52] U.S. Cl. .................. 60/274; 60/299; 423/213.2; 423/239.1
[58] Field of Search .................. 60/274, 282, 285, 60/299; 423/212, 213.2, 213.5, 239.1, 239.2

[56] References Cited

U.S. PATENT DOCUMENTS

| | | | |
|---|---|---|---|
| 4,541,996 | 9/1985 | Pereira et al. | 423/213.5 |
| 4,867,954 | 9/1989 | Staniulis et al. | 423/239.1 |
| 5,125,231 | 6/1992 | Patil et al. | 60/274 |
| 5,292,991 | 3/1994 | Lachman et al. | 423/239.1 |
| 5,412,945 | 5/1995 | Katoh et al. | 60/285 |
| 5,520,895 | 5/1996 | Sharma et al. | 423/239.1 |
| 5,543,124 | 8/1996 | Yokota et al. | 423/213.5 |
| 5,589,147 | 12/1996 | Farnos et al. | 423/239.2 |

FOREIGN PATENT DOCUMENTS 0 613 714  9/1994  European Pat. Off. .

Primary Examiner—Willis R. Wolfe
Attorney, Agent, or Firm—Lorraine S. Melotik

[57] ABSTRACT

The invention is a nitrogen oxide trap comprising a porous support; and catalysts comprising platinum and lithium loaded on the porous support, the lithium being present in a high loading of at least 10 weight percent based on the weight of the porous support. The trap may be used in an internal combustion engine exhaust gas catalyst system. During lean-burn operation of the engine the trap sorbs nitrogen oxides (NOx) and releases the nitrogen oxides during decreased oxygen concentration in the exhaust gas, the desorbed NOx being converted to $N_2$ and $O_2$.

16 Claims, 1 Drawing Sheet

SULFUR TOLERANT PT/LITHIUM NOX TRAPS

FIELD OF THE INVENTION

This invention relates to nitrogen oxide traps employed in the exhaust system of an internal combustion engine to absorb nitrogen oxides during lean-burn operation.

BACKGROUND OF THE INVENTION

Catalysts are employed in the exhaust systems of automotive vehicles to convert carbon monoxide, hydrocarbons, and nitrogen oxides ($NO_x$) produced during engine operation into more desirable gases. When the engine is operated in a stoichiometric or slightly rich air/fuel ratio, i.e., between about 14.7 and 14.4, catalysts containing palladium, platinum and rhodium, or palladium and rhodium are able to efficiently convert all three gases simultaneously. Hence, such catalysts are often called "three-way" catalysts. It is desirable to operate the engine under "lean-burn" conditions where the A/F ratio is greater than 14.7, generally between 19 and 27, to realize a benefit in fuel economy. Such three-way catalysts are able to convert carbon monoxide and hydrocarbons but are not efficient in the reduction of $NO_x$ during lean-burn (excess oxygen) operation.

One approach for treating NOx in exhausts from lean-burn engines which is currently receiving considerable attention involves the use of so-called $NO_x$ traps. The widely held mechanism for this absorption phenomena is that the platinum first oxidizes NO to $NO_2$ and the $NO_2$ subsequently forms a nitrate complex with the other material, e.g., an alkali metal like potassium. In a stoichiometric or rich environment, the nitrate is thermodynamically unstable, and the stored $NO_x$ is released. $NO_x$ then catalytically reacts with reducing species in the exhaust gas to form $N_2$.

European Patent Application 0613714A2 published Sep. 7th, 1994 discloses that platinum or palladium in various combinations with at least two ingredient materials of the alkali metals, alkaline earth metals, transition metals, or rare-earth metal are capable of storing or absorbing nitrogen oxides under exhaust conditions of excess oxygen. For example, when requiring two alkali metal ingredients, the loading amounts of the two ingredients is taught to preferably fall in a range of from 0.05 to 2.0 moles/liter in total. Taking lithium as the alkali metals, this corresponds to a range of 0.25 to 1.0 weight percent of the porous support material. This application instructs that when the alkali metals are loaded in an amount more than this upper limit, the advantageous effects resulting from the loading saturate, and the porous support diminishes the surface area.

The alkali metal and alkaline earth metals which are typically utilized for NOx sorption have, however, the serious drawback that they are readily poisoned by sulfur in the exhaust gas. Most fuels for automotive vehicles contain sulfur and when burnt, the sulfur is converted to sulfur compounds like $SO_2$. Over time, the sulfur compounds react with these trap materials forming sulfates which will not revert back to the sorption material. These sulfates are inactive for NOx sorption. As a result, the typical NOx trap is strongly deactivated by fuel sulfur. We have unexpectedly found that by forming a NOx trap from lithium and platinum and, most critically, loading the lithium in a significantly higher amount than previously described, this poisoning effect is substantially eliminated. Thus these present invention Li/Pt traps retain their NOx trapping efficiency as compared to those loaded with much less lithium.

DISCLOSURE OF THE INVENTION

This invention is directed to an nitrogen oxide ($NO_x$) trap useful to trap nitrogen oxides during the lean-burn operation of an internal combustion engine. It comprises a porous support loaded with catalysts comprising at least 10 percent by weight lithium and 0.2–4.0 percent by weight platinum, individually based on the weight of the support material. Preferably the support material is gamma-alumina. In another aspect, the invention is an internal combustion engine exhaust gas catalyst system comprising the $NO_x$ trap. The engine may be a gasoline engine or a diesel engine. The trap is arranged in the exhaust system and absorbs $NO_x$ when the air/fuel ratio of exhaust gas flowing into said trap is lean and releases the absorbed $NO_x$ when the oxygen concentration in the exhaust gas is lowered, as during stoichiometric or rich operation of the engine. According to another aspect, the invention is a process for trapping nitrogen oxides using the disclosed traps.

Advantageously, we have found that by using a relatively high loading of lithium in combination with platinum in a nitrogen oxide trap, sulfur poisoning of the trap material can be essentially eliminated. Thus, this invention trap is able to operate to sorb NOx without forming the sulfates which are ineffective for NOx sorption.

DESCRIPTION OF PREFERRED EMBODIMENTS

Figure 1:
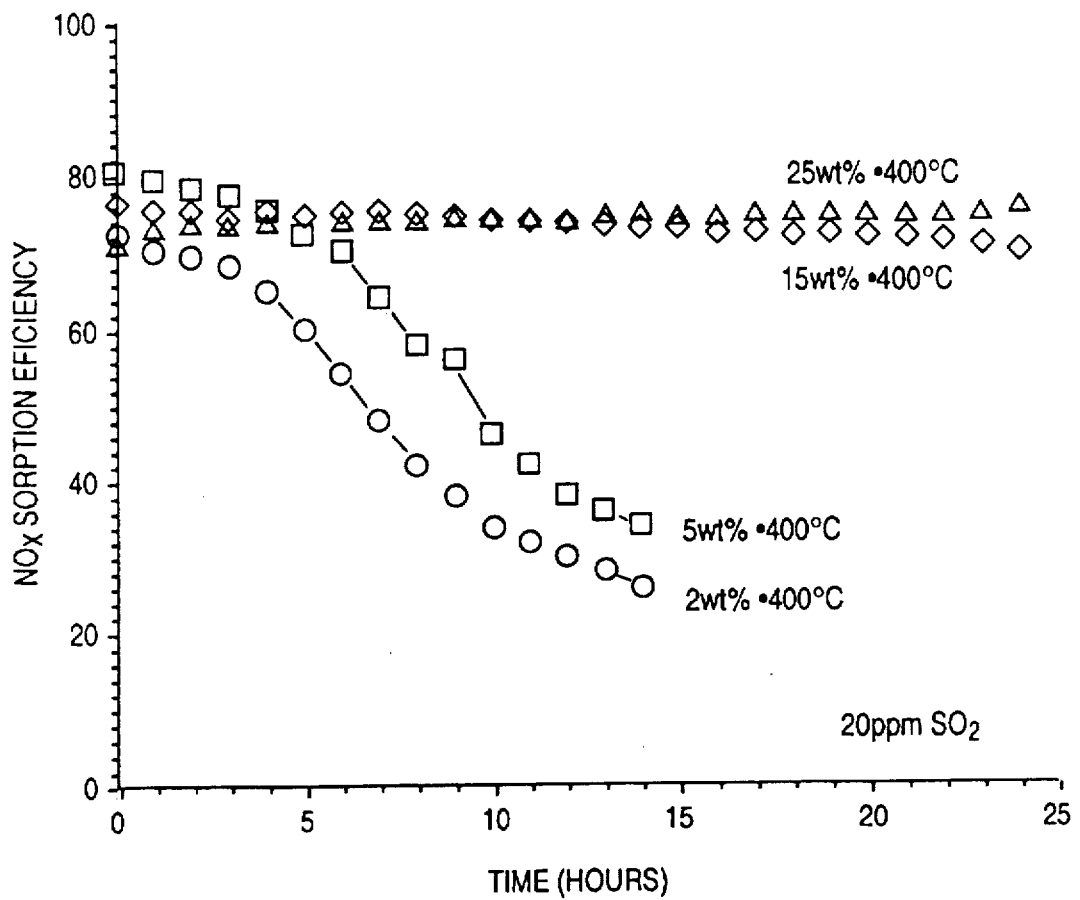
FIG. 1 is a graph showing the effect of sulfur poisoning on nitrogen oxide trapping efficiency of several lithium/platinum NOx traps (some being comparative examples) as the loading of the lithium is varied.

This invention, according to one aspect, is directed to an internal combustion engine exhaust gas catalyst system comprising a nitrogen oxide trap. The $NO_x$ trap comprises a porous support impregnated with lithium and platinum. It is required that the support is highly loaded with lithium. i.e., at least 10 weight percent lithium, preferably being at least 25 weight percent with a maximum of about 50 weight percent lithium. In addition, the support is loaded with platinum in an amount between 0.2 and 4 weight percent, preferably being between about 1 and 4 percent by weight, more preferably being about 1 to 2 weight percent platinum, most preferably being about 2. Optimally, the support carries about 10 to 50 weight percent lithium and 1 to 4 weight percent platinum. The weight percent of the lithium and platinum are each individually based on the weight of the porous support material. Also, it may be desirable to deposit a small quantity of rhodium on to the support material in an amount which is about 1/5 to 1/10 the platinum amount.

The porous support (washcoat) material loaded with the catalysts is preferably a high surface area washcoat material like alumina, preferably being gamma-alumina. Still other washcoat materials which may be used at the high operation temperatures associated with an internal combustion engine exhaust system include, but are not limited to, zeolite, ceria, and zirconia. Such washcoat materials, useful for carrying catalyst materials, are well known to those skilled in the art. The choice of the particular porous support (washcoat) material is not critical to this invention. Desirably, the support material has a surface area between about 5 and 300 $m^2/g$.

For useful application in an exhaust gas system of for example gasoline or diesel engines, the washcoat will be carried on a substrate of a high temperature stable, electrically insulating material. Typical of such substrate materials are cordierite, mullite, etc. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

The catalysts and washcoat may be applied to the substrate as a mixture of washcoat and catalyst or in sequential steps, the washcoat being applied first, in a manner which would be readily apparent to those skilled in the art of catalyst manufacture. Preferably, the washcoat is first applied to the substrate followed by drying and calcination of the washcoat. Then the lithium and platinum catalysts can be deposited on the washcoat, as by impregnation techniques well known to those skilled in the art. According to such techniques, the lithium and platinum catalysts, individually or together, would be dissolved as soluble precursors thereof, e.g., as a salt like lithium nitrate in an aqueous or organic solvent solution which is then impregnated into the washcoat. The lithium and platinum can be impregnated sequentially; the order is not important. The lithium and platinum precursors can also be dissolved together in a common solution and impregnated into the porous support in a single step. The particular salt employed as well as the solvent is not critical to this invention. Exemplary platinum containing compounds include chloroplatinic acid. Other such materials which may be used would be apparent to those skilled in the art in view of the present disclosure. Drying and calcination of the impregnated washcoat in air generally converts the lithium nitrate to lithium oxide on the washcoat material.

As is known in the art, $NO_x$ traps are susceptible to poisoning by sulfur compounds present in the exhaust gases. We have found that by using a very high loading of lithium along with platinum, this problem is essentially overcome. That is, the NOx trapping efficiency of the catalyst is maintained as shown in FIG. 1.

The internal combustion engine catalyst system of this invention may include another catalyst device as, for example, a catalytic converter employing a conventional three-way catalyst containing palladium, etc. The three-way catalyst can be placed upstream of the $NO_x$ trap, hence closer to the engine. In such an arrangement, the three-way catalyst being closely mounted to the engine would warm up quickly and provide for efficient engine cold start emission control. Once the engine is warmed up, the three-way catalyst will remove hydrocarbons, carbon monoxide, and nitrogen oxides from the exhaust during stoichiometric operation and hydrocarbons and carbon monoxide during lean operation. The $NO_x$ trap would be positioned downstream of the three-way catalyst where the exhaust gas temperature enables maximum $NO_x$ trap efficiency. Also, with the $NO_x$ trap positioned downstream of the three-way catalyst in a remote location, it is protected against very high exhaust gas temperatures which could damage it. During periods of lean-burn engine operation when $NO_x$ passes through the three-way catalyst, $NO_x$ is stored on the trap. The $NO_x$ trap is periodically regenerated by short periods or intervals of slightly rich engine operation. The stored $NO_x$ is then released from the alkali metal trapping material and is catalytically reduced over the platinum by the excess CO, $H_2$ and HCs present in the exhaust. In general, the released $NO_x$ is efficiently converted to $N_2$, which efficiency is enhanced when rhodium is contained within the $NO_x$ trap washcoat. However, one may wish to place a second three way catalyst downstream of the $NO_x$ trap in order to further aid in this regard.

This invention catalyst has particular utility when used with lean-burn engines. Lean-burn engines are those which at least during part of their operation operate with air/fuel ratios containing excess oxygen relative the stoichiometric ratio. For gasoline engines that range is usually 19–27 and for diesel the range is usually 19–40.

EXAMPLE 1

A nitrogen oxide trap according to an embodiment of the present invention was prepared as follows. Gamma-alumina (100 m2/g) was ball milled and mixed with distilled water to produce a slurry. The slurry was applied to a corderite monolith (400 cells/in$^2$) to obtain a 25 wt % loading of the alumina. The monolith was subsequently dried at 120° C. to remove the water and calcined in air at 500° C. for 6 hours.

The alumina coated monolith was first impregnated with an aqueous solution containing lithium nitrate adjusted so as to provide 15 wt % lithium on the alumina washcoat. Following impregnation with the solution, the alumina was dried at 120° C. for 4 hours to remove the water and then calcined at 500° C. for 6 hours. The resulting product was then loaded with platinum in a similar fashion. That is, this washcoat was subsequently impregnated with an aqueous solution containing hexachloroplatinic acid (adjusted so as to provide 2.0 wt % platinum on the alumina washcoat), dried, and calcined as above.

Similar lithium/platinum trap were made as above the only variation being in the loading of the lithium which varied from 2 wt % to 25 wt % as shown in FIG. 1. The traps with 2 and 5 wt % are comparative examples, which the others are according to embodiments of the present invention.

In order to test the $NO_x$ sorption efficiency of the traps when subjected to $SO_2$, they were subjected to a simulated exhaust gas containing: 500 ppm NO, 10% $CO_2$, 10% $H_2O$, 0.1% CO, 0.03% $H_2$, 50 ppm $C_3H_6$, 20 ppm $SO_2$ and 6% $O_2$. The total exhaust gas flow rate was 3 liter/min and the space velocity was 20,000 hr$^{-1}$.

It can be seen from FIG. 1 that as the lithium loading is increased, the sulfur poisoning is significantly mitigated. With the 25 wt % lithium sample, no loss of $NO_x$ trapping efficiency was observed. This was unexpected since, as discussed above, European Application 0613714A2 teaches away from loading lithium above 1 wt %. While not wishing to be bound by theory, it is believed that a platinum-lithium interaction is created which suppresses the formation of sulfate over the platinum as the lithium loading is increased. Neither the validity nor understanding of this theory is necessary for the practice of this invention.

EXAMPLE 2

A gamma alumina coated monolith is prepared according to the previous example and impregnated with an aqueous solution containing lithium nitrate adjusted so as to provide for 25 wt % lithium on the alumina washcoat. Following impregnation, the monolith is dried at 120° C. for 4 hours and then calcined at 500° C. for 6 hours. The resulting product is then impregnated with an aqueous solution containing hexachloroplatinic acid and rhodium nitrate, dried, and calcined as above. The concentrations of hexachloroplatinic acid and rhodium nitrate are adjusted so as to provide for 2 wt % Pt and 0.2 wt % Rh on the alumina washcoat. The $NO_x$ is efficiently trapped by the catalyst.

EXAMPLE 3

A gamma alumina coated monolith is prepared according to the previous example and impregnated with an aqueous solution containing lithium nitrate adjusted so as to provide for 25 wt % lithium on the alumina washcoat. Following impregnation, the monolith was dried at 120° C. for 4 hours and then calcined at 500° C. for 6 hours. The resulting product is then impregnated with an aqueous solution containing hexachloroplatinic acid; the concentration of hexachloroplatinic acid is adjusted so as to provide 1.0 wt % of platinum on the alumina washcoat. The monolith is then dried and calcined as before. The $NO_x$ is efficiently trapped by the catalyst.

EXAMPLE 4

A gamma alumina coated monolith is prepared according to the previous example and impregnated with an aqueous solution containing lithium nitrate and hexachloroplatinic acid; the concentrations are adjusted so as to provide for 25 wt % platinum on the alumina washcoat. Following impregnation, the monolith is dried at 120° C. for 4 hours and then calcined at 500° C. for 6 hours. The $NO_x$ is efficiently trapped by the catalyst.

EXAMPLE 5

Gamma alumina powder (100 m²/g) is impregnated via an incipient wetness technique with a solution containing lithium nitrate and hexachloroplatinic acid; the concentrations of lithium nitrate and hexachloroplatinic acid are adjusted so as to provide for 25 wt % lithium and 2 wt % platinum on the alumina powder. Following impregnation, the alumina powder is dried at 120° C. for 4 hours and then calcined at 500° C. for 6 hours. The resulting product is then ball milled and mixed with distilled water in order to produce a slurry. The slurry is applied to a corderite monolith to obtain a 25 wt % loading of the Pt/Li/γ-$Al_2O_3$ material. The monolith is subsequently dried at 120° C. to remove the water and calcined in air at 500° C. for 6 hours. The $NO_x$ is efficiently trapped by the catalyst.

We claim:

1. A nitrogen oxide trap useful for trapping nitrogen oxide present in the exhaust gases generated during lean-burn operation of an internal combustion engine, said trap comprising:

a porous support; and catalysts comprising at least 10 weight percent lithium and 0.2 to 4 weight percent platinum loaded on said porous support, each individually based on the weight of the porous support.

2. The nitrogen oxide trap according to claim 1 wherein platinum is present in an amount of about 1 to 2 weight percent on said support.

3. The nitrogen oxide trap according to claim 1 wherein said support comprises alumina.

4. The nitrogen oxide trap according to claim 1 wherein said support is loaded with about 1 to 4 wt. percent platinum and 10 to 50 wt. percent lithium, each based on the weight of the porous support.

5. The exhaust gas catalyst system according to claim 4 which further comprises a three way catalyst positioned upstream of the nitrogen oxide trap.

6. The exhaust gas catalyst system according to claim 5 which further comprises a three-way catalyst positioned downstream of the nitrogen oxide trap.

7. An internal combustion engine exhaust gas catalyst system comprising a nitrogen oxide trap being arranged in the exhaust system and absorbing nitrogen oxides when the air/fuel ratio of exhaust gas flowing into said trap is lean, said nitrogen oxide trap releasing absorbed nitrogen oxides when the oxygen concentration in said exhaust gas is lowered, said nitrogen oxide trap comprising:

a porous support; and catalysts comprising at least 10 weight percent lithium and 0.2 to 4 weight percent platinum loaded on said porous support, each individually based on the weight of the support.

8. The exhaust gas catalyst system according to claim 7 wherein platinum is loaded on said support in an amount of 1 to 2 weight percent.

9. The exhaust gas catalyst system according to claim 7 wherein said support comprises alumina.

10. The exhaust gas catalyst system according to claim 7 wherein said support was loaded with about 1 to 4 wt. percent platinum and 10 to 50 wt. percent lithium, each based on the weight of the porous support.

11. A process for trapping nitrogen oxides from the exhaust gases generated during lean-burn operation of an internal combustion engine, said process comprising the steps of:

bringing said oxygen-rich exhaust gases, whose oxygen content is at the stoichiometric or more required for oxidizing the components to be oxidized therein, into contact with a nitrogen oxide trap comprising:

a porous support; and catalysts comprising at least 10 weight percent lithium and 0.2 to 4 weight percent platinum loaded on said porous support, each individually based on the weight of the support.

12. The process according to claim 11 wherein platinum is loaded on said support in an amount of about 1 to 4 weight percent.

13. The process according to claim 11 wherein said support comprises alumina.

14. The process according to claim 11 wherein said support was loaded with about 1 to 4 wt. percent platinum and 10 to 50 wt. percent lithium, each based on the weight of the porous support.

15. The process according to claim 11 which further comprises the step of contacting said exhaust gases with a three way catalyst positioned upstream of the nitrogen oxide trap.

16. The process according to claim 15 which further comprises a three-way catalyst positioned downstream of the nitrogen oxide trap.

* * * * *